Figure 1:
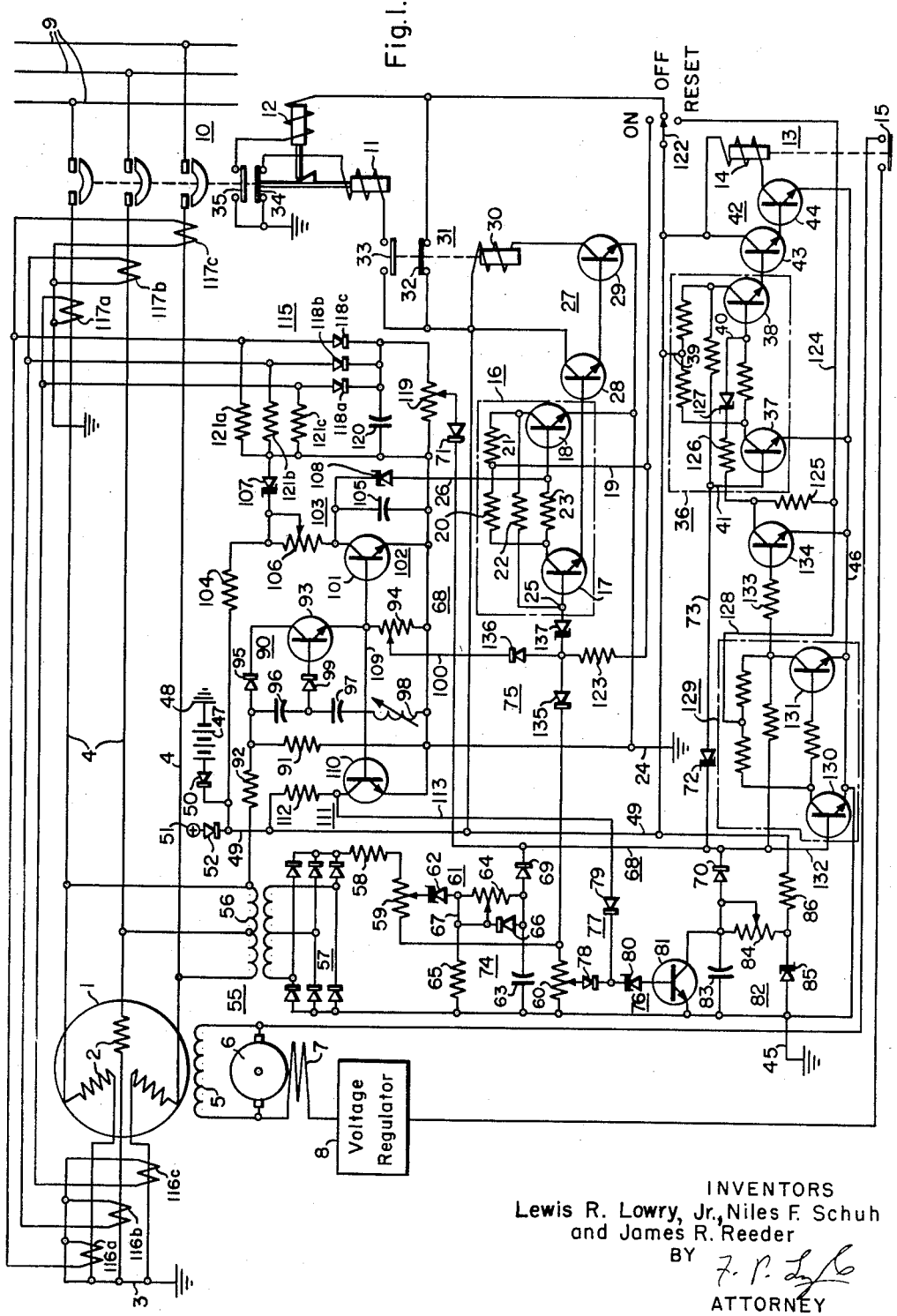

United States Patent Office 2,885,568
Patented May 5, 1959

2,885,568

GENERATOR CONTROL AND PROTECTIVE SYSTEM

James R. Reeder, Niles F. Schuh, and Lewis R. Lowry, Jr., Lima, Ohio, assignors to Westinghouse Electric Corporation, East Pittsburgh, Pa., a corporation of Pennsylvania Application April 18, 1957, Serial No. 653,592

17 Claims. (Cl. 307—87)

The present invention relates to the control and protection of electric generators and, more particularly, to a static system for the control and protection of alternating current generators.

While the system of the present invention is not necessarily restricted in its usefulness to any particular application, it is especially suitable for use with aircraft generators or in other similar applications where the weight and size must be kept to a minimum and where a high degree of reliability is required.

A control and protective system for alternating current generators must include means for sensing various conditions of the generator, such as voltage, frequency, etc., and for effecting control of the generator circuit breaker and of the generator field excitation in response to signals derived from the sensing means. In the conventional control and protective systems which have been used heretofore on aircraft, electromechanical relays have commonly been used for these purposes and thermal relays have often been employed to obtain the necessary time delays.

Conventional control panels, consisting of an assembly of such relays together with the necessary transformers, rectifiers and other components, have necessarily been relatively large and heavy and have involved a number of difficult problems. The electromechanical relays used in conventional systems must be sensitive relays accurately calibrated as to their operating points and, in many cases, the dropout points of the relays must also be accurately determined. Such relays are necessarily quite sensitive, but the accuracy of calibration must be maintained under the severe environmental conditions to which aircraft equipment is subjected. Thus, the calibration must be maintained over a very wide temperature range, which usually requires some type of temperature compensation, and under severe conditions of vibration, mechanical shock and acceleration forces, which requires the use of vibration isolators and shock mountings which increase the size and complication of the system but do not always completely protect the relays under all conditions.

In these conventional systems, it is also sometimes necessary to use alternating current relays, which are realtively large and heavy, as compared to direct current relays, and which require a relatively large amount of power for operation. The sensing circuits, therefore, must include components of sufficient capacity to operate these relays, thus reducing the sensitivity of the sensing circuits and increasing the power loss and the amount of heat to be dissipated, as well as the size and weight of the system. The thermal relays which are often use to obtain time delays also require a relatively large amount of power and are not entirely satisfactory since the time delay obtained varies with variation in the supply voltage, and may be reduced if the relay has not had sufficient cooling time after a previous operation.

Thus, the conventional control and protective systems which have been used heretofore have had many disadvantages, since they are complicated and difficult to build, are undesirably large and heavy, and do not provide as high a degree of reliability as is needed because of the difficulty of maintaining accurate calibration of the relays as well as the unavoidable wear of moving parts.

The principal object of the present invention is to provide a control and protective system for electric generators which can be made very small and compact but which is highly reliable and which avoids the disadvantages of the conventional systems outlined above.

A further object of the invention is to provide a static control and protective system for electric generators which completely eliminates the necessity for accurately calibrated sensitive relays by utilizing static circuits comprising semiconductor devices and other static components of small size and high reliability, thus providing a system which can be made small in size and light in weight but which has greater reliability than the conventional systems heretofore used while eliminating their disadvantages.

More specifically, there is provided a new type of control and protective system based on a new approach to the problem. In this new system, static circuits are used throughout, eliminating the accurately calibrated relays previously required and making possible the use of miniaturized components of small size and high reliability which are not affected by vibration or mechanical shock, or other adverse environmental conditions. In this system, all sensing and time relay functions are performed at a low power level by static circuits, and the necessary mixing or logic functions are performed on the output signals of the sensing circuits by static logic circuits. The control functions for effecting operation of the generator circuit breaker and field control relay are performed by static bistable circuits or flip-flops, still at a low power level, the final output signals being amplified to a sufficiently high level to effect operation of the final control devices. In this way a system is provided which operates almost entirely at a low power level, so that there is little heat to be dissipated, and small, rugged, static components are utilized so that the system can be made small and compact but is highly reliable, since it does not depend on accurate calibration of devices involving moving parts, and it is substantially unaffected by environmental conditions so that it is very suitable for aircraft use.

Figure 2:
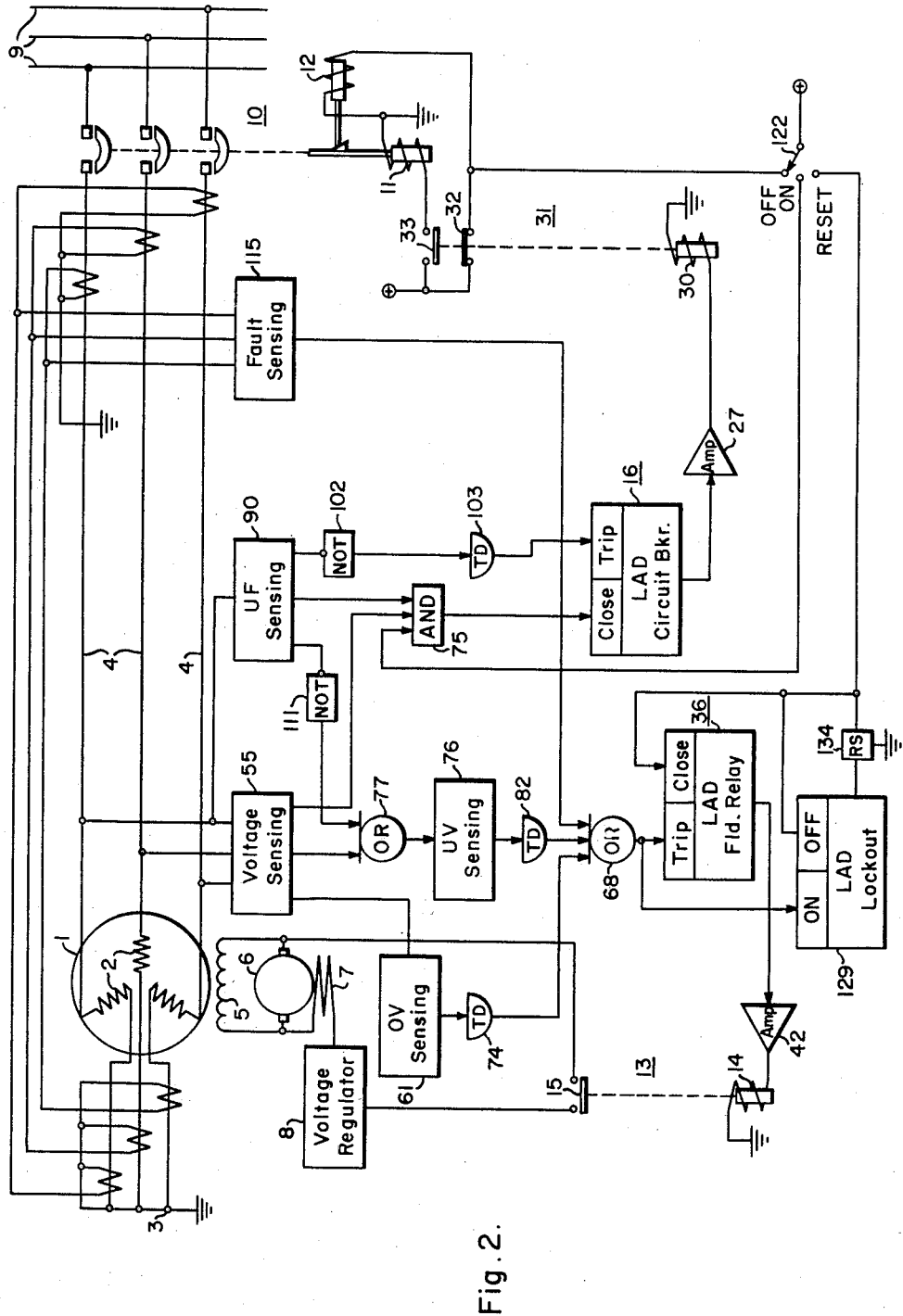

The invention will be more fully understood from the following detailed description of a typical embodiment, taken in connection with the accompanying drawings, in which:

Figure 1 is a schematic diagram of an illustrative embodiment of the system; and Fig. 2 is a block diagram of the system of Fig. 1.

It will be apparent that the basic principles of the invention can be applied in various ways to perform the sensing and control functions required for different installations. In order to illustrate the invention, a typical embodiment has been shown in the drawings applied to the control and protection of a single alternating current generator.

As shown in the drawings, a system is provided for the control and protection of an alternating current generator 1 which is shown as a three-phase generator having armature windings 2. One end of each of the phase windings 2 is brought out of the machine to a neutral point 3 and the other ends are connected to leads or feeders 4. The generator 1 also has a field winding 5 supplied with direct current excitation from an exciter 6 of any suitable type. The exciter 6 is shown, for the purpose of illustration, as being a direct current exciter with a self-excited shunt field winding 7. It is to be understood, however, that the exciter 6 represents any suitable type of exciter or excitation system, either rotating or static, and is preferably provided with a voltage regulator 8 of any suitable type, which has not been illustrated in detail since it is not a part of the invention. The generator 1 and exciter 6 may be of any suitable physical construction and may be driven by any suitable prime mover (not shown), such as an airplane engine.

The feeders 4 are connected to a three-phase load bus or external circuit 9 by means of a circuit breaker 10. The circuit breaker 10 may be of any suitable type and is shown as being a latch-type breaker having a closing coil 11 and a trip coil 12.

The field excitation of the generator 1 is controlled by a field relay 13 having an operating coil 14 and a contact 15. The field relay 13 may be of any suitable type and is shown as a simple electromagnetic relay having its contact 15 connected, as shown, in series with the exciter field winding 7, so that when the contact 15 is opened, the exciter field circuit is interrupted and the generator field winding 5 is deenergized to remove excitation from the generator. It is to be understood, however, that the field relay 13 may be connected in any desired manner to control the generator field excitation and that the relay shown is to be taken as representing any suitable device capable of use for this purpose.

The circuit breaker 10 is controlled by a static flip-flop circuit 16. This circuit may be any suitable type of bistable circuit which has two stable conditions to provide an on-off or digital type of output signal, and which is arranged so that when actuated to either of its stable states, it remains in that state until a signal is applied to cause it to change to the other state. Such a circuit may be described as a latched analog-to-digital converter and will be referred to hereinafter, for convenience, as a LAD circuit.

Any suitable circuit of this type may be used. The particular circuit shown in the drawing for the purpose of illustration includes two transistors 17 and 18 connected as shown. Supply voltage is applied to the circuit through a conductor 19 which is connected through resistors 20 and 21 to the collectors of both transistors. The resistor 21 is also connected through a resistor 22 to the base of transistor 17, and a connection is provided from the resistor 20 through a resistor 23 to the base of transistor 18. The values of the resistors are so chosen that when the supply voltage is applied to conductor 19 with no signal applied to the circuit 16, the transistor 18 is conductive and the transistor 17 is nonconductive, so that the supply voltage is shunted to ground at 24 through the transistor 18. If a signal is applied to the base of transistor 17, through conductor 25, the transistor 17 is made conductive and the transistor 18 ceases to be conductive, so that an output signal is obtained from the transistor 17. The LAD circuit 16 will then remain in this condition until it is deenergized or until a signal is applied through conductor 26 to the base of transistor 18, which will cause transistor 18 to become conductive and transistor 17 to become nonconductive.

The output signal of the LAD circuit 16 is used to control the circuit breaker 10, as previously indicated. Since it is preferred to operate the system at a low power level, as previously mentioned, the output of the LAD circuit 16 is too low to operate the circuit breaker 10 directly, and it is amplified by means of a two-stage transistor amplifier 27 consisting of cascaded transistors 28 and 29, with the operating coil 30 of a pilot relay 31 connected in the collector circuit of the transistor 29. The pilot relay 31 may be a small, rugged type of relay which does not require accuarte calibration, since it is actuated only by an on-off type of signal and is always either deenergized or fully energized. The relay 31 has a contact 32 which is closed when the relay is deenergized, and a contact 33 which is closed when the relay is energized. The contact 32 is connected, as shown, to the breaker trip coil 12. The contact 33 is connected to the closing coil 11 so that when the relay 31 is energized, the contact 33 completes the circuit of the breaker closing coil 11 through an auxiliary contact 34 to close the circuit breaker 10. When the relay 31 is deenergized, the contact 32 completes a circuit for the trip coil 12, through an auxiliary contact 35, to trip the breaker.

The field relay 13 is controlled by a LAD circuit 36, which may be similar to the LAD circuit 16 described above, and which includes a transistor 37 and a transistor 38. The circuit 36 is shown as being like the circuit 16, and the values of the resistors are chosen so that when the supply voltage is applied to circuit 36 through conductor 39, the transistor 37 is conductive and the transistor 38 is nonconductive. When a signal is applied to the base of the transistor 38 through conductor 40, transistor 38 becomes conductive and transistor 37 ceases to conduct, while when a signal is applied to the base of transistor 37 through the conductor 41, transistor 37 becomes conductive and transistor 38 ceases to conduct.

The output of the LAD circuit 36 when the transistor 38 is conductive is utilized to control the field relay 13. As before, the output of the LAD circuit 36 must be amplified to a sufficient level to operate the relay, and a two-stage transistor amplifier 42 is provided for this purpose consisting of two cascaded transistors 43 and 44 connected as shown to energize the coil 14 of the field relay 13. Thus, when the transistor 38 of the LAD circuit 36 is made conductive, the relay 13 is energized to close its contact 15, while when the transistor 37 is made conductive, the supply voltage is shunted to ground at 45, through a ground conductor 46, and the relay 13 is deenergized to permit its contact to open.

Control power for operation of the LAD circuits 16 and 36, and of the relays 13 and 31, as well as for other purposes as hereinafter described, may be provided in any suitable manner. A direct current supply is indicated diagrammatically by a battery 47, which has its negative terminal connected to ground at 48 and its positive terminal connected to a direct current supply conductor 49 through a blocking rectifier 50. The battery 47 is intended to be representative of any available source of direct current such as the direct current bus which is normally available on most aircraft. A second source of direct current, indicated diagrammatically at 51, is preferably provided for increased reliability and is also connected to the conductor 49 through a blocking rectifier 52. The direct current source 51 may be any suitable direct current source such as a small auxiliary generator, or it may be derived from the output of the generator 1 through a transformer and rectifier.

The LAD circuits 16 and 36, which control the generator circuit breaker and the generator field excitation, respectively, are controlled in response to signals derived from static sensing circuits. Any desired number and type of sensing circuits may be utilized, to respond to different predetermined conditions of the generator, and the output signals of the sensing circuits are mixed or combined, to effect the desired control of the LAD circuits, by means of static logic circuits. These logic circuits may be of known types including And circuits in which an output signal occurs only when all of a plurality of input signals are present, Or circuits in which an output signal occurs when any one or more of a plurality of input signals are present, and Not circuits in which an output signal occurs not only when an input signal is not present. The output signals of the sensing circuits are applied to the logic circuits, and the outputs of the logic circuits, in turn, are used to effect operation of the LAD circuits 16 and 36 to cause operation of the circuit breaker 10 or field relay 13, or both in a desired manner in response to a predetermined condition, or combination of conditions, of the generator.

In the illustrated embodiment of the invention, sensing circuits are shown which respond to overvoltage (OV) and undervoltage (UV) of the generator, underfrequency (UF) of the generator, and to a fault in the generator or on the feeders 4.

Voltage sensing is provided by a sensing circuit 55 which comprises a three-phase, open delta transformer 56 having its primary windings connected to the generator terminals and its secondary windings connected to a three-phase full-wave rectifier bridge 57. The direct current output of the rectifier 57 is thus proportional to the average of the three phase voltages of the generator 1. The output voltage of the rectifier 57 is connected through a dropping resistor 58, across an adjustable voltage divider or potentiometer 59 in series with a second adjustable voltage divider or potentiometer 60, one side of the rectifier also being connected to ground at 45.

The voltage across the potentiometer 59 is utilized to energize an overvoltage sensing circuit 61 which may be an inverse time delay voltage-responsive circuit of any suitable type, and which is shown as being of the type disclosed and claimed in a copending application of N. F. Schuh, Serial No. 562,427, filed January 31, 1956. As described in that application, the circuit 61 is connected to the potentiometer 59 through a voltage sensitive semiconductor device 62 of the type usually referred to as a Zener diode. Such a device is a semiconductor diode, preferably a silicon diode, which acts as a rectifier to prevent appreciable current flow in the reverse direction when the reverse voltage is below a predetermined breakdown voltage, often called the Zener voltage. When the reverse voltage exceeds this value, the diode breaks down and permits current to flow freely in the reverse direction, the voltage across the diode remaining substantially constant. Devices of this type thus may be used as voltage sensitive devices or as voltage regulating devices and are used in the present system for both purposes.

The overvoltage sensing circuit 61 includes a capacitor 63 connected to the potentiometer 59, through the Zener diode 62, in series with an adjustable resistor 64. The other side of the capacitor 63 is connected to ground 45, so that it is charged by the voltage of the potentiometer 59 when it exceeds the breakdown voltage of the diode 62. An auxiliary discharge circuit for the capacitor 63 is provided consisting or a resistor 65 and a rectifier 66 connected across the capacitor 63. A biasing connection 67 is provided between the resistor 65 and the diode 62.

The Zener diode 62 is selected to have a breakdown voltage corresponding to the generator voltage at which operation is desired, the operating point being adjustable by means of the potentiometer 59. Under normal voltage conditions, only an extremely small leakage current flows through the diode 62 and the discharge circuit 65—66 prevents any charge from building up on the capacitor 63. When the generator voltage exceeds the maximum permissible value, the diode 62 breaks down and permits the capacitor 63 to be charged at a rate determined by the setting of the adjustable resistor 64 and the magnitude of the applied voltage, the rectifier 66 being biased in the reverse direction through the connection 67 so that the charge of the capacitor cannot leak off through the auxiliary discharge circuit.

The voltage of the capacitor 63 provides the output signal of the overvoltage sensing circuit 61 and is applied to an Or circuit 68 (Fig. 2) which includes three rectifiers 69, 70 and 71, the capacitor 63 being connected to the rectifier 69. The output of the Or circuit 68 is applied through a Zener diode 72 and a conductor 73 to the LAD circuit 36 to effect operation of that circuit in the manner hereinafter described. It will be noted that the voltage of the capacitor 63 is directly applied to the Or circuit 68 but is blocked from the LAD circuit 36 until the capacitor voltage reaches the breakdown value of the diode 72. The time required for the capacitor voltage to reach this value depends on the charging rate of the capacitor, which is adjustable by means of the resistor 64, and which depends on the magnitude of the applied voltage, so that an inverse time delay is obtained as indicated diagrammatically at 74 in Fig. 2.

The potentiometer 60, which is also energized by the voltage sensing circuit 55, is used to supply a voltage signal for control of the LAD circuit 16, as described below, and for that purpose is connected to an And circuit 75 which will be more fully described hereinafter.

The potentiometer 60 is also utilized to supply and adjustable voltage to an undervoltage sensing circuit 76 through an Or circuit 77. The Or circuit 77 consists of two rectifiers 78 and 79 which are connected together and to the undervoltage sensing circuit 76, as shown, and the voltage of the potentiometer 60 is connected to the undervoltage sensing circuit through the rectifier 78.

The undervoltage sensing circuit 76 consists of a Zener diode 80 connected to the base of a transistor 81. The transistor 81 controls a time delay circuit 82 which includes a capacitor 83 connected across the collector and emitter of the transistor 81. The capacitor 83 is connected to be charged from the direct current supply conductor 49 through an adjustable resistor 84. In order to obtain a constant time delay, it is necessary to maintain a constant charging voltage, and a Zener diode 85 is used for this purpose. The diode 85 has a breakdown voltage below the normal voltage of the direct current supply and is connected between the direct current supply conductor 49 and ground through a resistor 86. The capacitor 83 and resistor 84 are connected across the Zener diode 85, and it will be seen that the substantially constant voltage across the diode 85 is used for charging the capacitor, so that a constant charging rate is obtained determined by the adjustment of the resistor 84.

The breakdown voltage of the diode 80 is chosen so that when the generator voltage is above the desired minimum, the diode 80 is conducting and permits base current to flow to the transistor 81. The transistor is therefore conducting and short-circuits the capacitor 83 so that it cannot build up a charge. When the generator voltage falls below the desired minimum value, however, the diode 80 becomes non-conductive and cuts off the base current of the transistor 81 so that the transistor becomes nonconductive. The capacitor 83 is thus permitted to charge at a rate determined by the resistor 84 and its voltage is applied to the rectifier 70 which constitutes part of the Or circuit 68. The output signal of the undervoltage sensing circuit 76 is thus applied to the Zener diode 72 and, after a time delay determined by the charging rate of the capacitor 83, it exceeds the breakdown voltage of the diode 72 and is thus supplied to the LAD circuit 36.

A frequency sensing circuit 90 is also provided to detect underfrequency of the generator 1. The underfrequency sensing circuit may be of any suitable type which will provide an output signal when the generator frequency is above a predetermined value and will interrupt the signal when the generator frequency falls below that value. The particular underfrequency sensing circuit shown for the purpose of illustration is of the type disclosed and claimed in a copending application of N. F. Schuh, Serial No. 580,868, filed April 26, 1956. This circuit is supplied from the voltage across a resistor 91 connected between one terminal of the generator 1 and ground 24, preferably through a dropping resistor 92 to reduce the voltage to a desired level. The frequency sensing circuit 90 includes a transistor 93 which has its collector and emitter connected across the resistor 91, as shown, in series with a resistor 94. A rectifier 95 is connected in the collector circuit to function as a half-wave rectifier to provide unidirectional current flow through the transistor.

The transistor 93 is controlled by means of a frequency sensitive circuit consisting of two capacitors 96 and 97 connected in series with an adjustable inductance 98 across the resistor 91. The frequency sensitive circuit is adjusted so that when the generator frequency is below the predetermined value, the frequency sensitive circuit is essentially capacitive, while when the frequency rises above the predetermined value, the frequency sensitive circuit becomes essentially inductive. The base of the transistor 93 is connected between the two capacitors 96 and 97, as shown, through a rectifier 99 to insure proper direction of current flow. It will be understood that since current can flow in only one direction through the transistor, because of the rectifier 95, the transistor will be conductive only when the voltage applied to the base is in phase with the voltage across the collector and emitter. It can be shown, as more fully described in the above-mentioned application, that with the circuit connection shown the base voltage is in phase with the collector-emitter voltage when the generator frequency is above the predetermined value, so that the transistor 93 is conductive and a voltage appears across the resistor 94, while the transistor becomes non-conductive and the voltage across resistor 94 vanishes when the frequency falls below the predetermined value.

An adjustable output signal is taken from the voltage across the resistor 94 by means of a conductor 100 and applied to the And circuit 75 for control of the LAD circuit 16, as described hereinafter.

A second output signal, from the voltage across the resistor 94, is applied to the base of a transistor 101 which is connected in a Not circuit 102 to control a time delay circuit 103. The collector of transistor 101 is connected to the direct current supply conductor 49, through a resistor 104, and the emitter is connected to ground 24. When an output signal from the frequency sensing circuit 90 is present, indicating that the generator frequency is above the predetermined minimum, the transistor 101 is conductive. When the generator frequency is below the predetermined minimum, the output signal of the sensing circuit 90 disappears and the transistor 101 becomes nonconductive.

The transistor 101 controls the time delay circuit 103 which consists of a capacitor 105 charged from the direct current supply through an adjustable resistor 106. The time delay circuit 103 is similar to the time delay circuit 82 previously described and is supplied with a constant voltage by means of a Zener diode 107 connected to the direct current supply 49. When the transistor 101 becomes nonconductive, the capacitor 105 is permitted to charge and its voltage is applied through a Zener diode 108 to the conductor 26, so that a signal is supplied to the LAD circuit 16, after a predetermined time delay, in response to underfrequency of the generator.

A third output signal from the underfrequency sensing circuit 90 is applied through a conductor 109 to the base of a transistor 110 connected in a Not circuit 111. The collector and emitter of the transistor 110 are connected between the direct current supply conductor 49 and ground 24, through a resistor 112, so that when an output signal appears from the frequency sensing circuit 90, the transistor 110 is made conductive and connects the resistor 112 to ground so that no output signal is obtained from the Not circuit. When the output signal of the frequency sensing circuit 90 disappears the transistor 110 becomes nonconductive and an output signal is obtained which is applied through the conductor 113 to the rectifier 79 which forms part of the Or circuit 77. This signal voltage is thus supplied to the undervoltage sensing circuit 76 for a purpose which will be described hereinafter.

A fault sensing or differential protection circuit 115 is also provided. This fault sensing circuit may be any suitable type of circuit which provides an output signal in response to internal faults in the generator or faults on the feeders 4. The particular fault sensing circuit shown is of the type disclosed and claimed in a copending application of N. F. Schuh et al., Serial No. 617,443, filed October 22, 1956. This circuit is a differential protective system utilizing three current transformers 116a, 116b, and 116c connected in the neutral leads of the generator 1 and three current transformers 117a, 117b, and 117c connected in the feeders 4 adjacent the circuit breaker 10. The secondaries of corresponding transformers on opposite sides of the generator are connected together, as shown, the other ends of the respective secondary windings being connected to ground. The current transformers are connected together differentially so that under normal conditions, when the currents are the same on opposite sides of the generator, the transformer secondary voltages will be equal and opposite and no currents flow between them. Upon the occurrence of a fault in the generator or on one or more of the feeders 4 in the protected zone between the two sets of transformers, the secondary voltages will no longer be equal and circulating current will flow.

The fault sensing circuit proper consists of three rectifiers 118a, 118b and 118c connected respectively to the three current transformer circuits as shown. The other sides of the three rectifiers are connected together and to ground 24 through a resistor 119, a filter capacitor 120 preferably also being provided. Three resistors 121a, 121b and 121c are preferably connected between the rectifier leads and ground, as shown, to provide a fixed load on the current transformers. It will be seen that upon the occurrence of a fault, a current will flow to ground through one or more of the rectifiers 118a, 118b or 118c and a voltage will appear across the resistor 119. This signal voltage is applied to the rectifier 71, which is part of the Or circuit 68, and thus to the LAD circuit 36 as previously described.

The complete system is controlled by means of a manual switch 122 which has an On position, an Off position, and a Reset position. The switch 122 is connected to the direct current supply conductor 49 and in the Off position shown in the drawings is connected to the trip coil 12 of the circuit breaker 10, the other end of the trip coil being connected to ground as shown. In the On position of the switch 122, the direct current supply is connected through a resistor 123 to the And circuit 75. In the Reset position of the switch 122, the direct current supply is connected through a conductor 124, resistors 125 and 126 and a Zener diode 127 to the LAD circuit 36.

The conductor 124 also provides the supply voltage for a lockout LAD circuit 129 through a conductor 128. The LAD circuit 129 is provided for the purpose of preventing cycling of the system if it is attempted to reset under fault conditions. The LAD circuit 129 may be any suitable type of bistable or flip-flop circuit and is shown as being similar to the circuits 16 and 36. Thus, this circuit includes two transistors 130 and 131 and is arranged so that when the supply voltage is applied with no external signal, the transistor 131 is conducting and shunts the supply voltage to the ground conductor 46, so that substantially no voltage appears across transistor 131. When a signal is applied to the base of the transistor 130, through conductor 132, the transistor 130 is made conductive and the transistor 131 becomes nonconductive, so that a voltage appears across the transistor 131 which is applied through a resistor 133 to the base of a reset shorting (RS) transistor 134. The collector-emitter circuit of the transistor 134 is connected, as shown, between the resistor 125 and ground conductor 46, so that when the transistor 134 is made conductive, the reset signal from the switch 122 is shorted to ground.

The operation of this system may be described as follows. The system is shown in its off condition with the generator circuit breaker 10 and field relay 13 both open. If it is now desired to bring the generator 1 up to voltage and connect it to the load bus 9, the manual switch 122 is first placed on the Reset contact. As previously described, this connects the direct current supply through conductor 124 to conductor 40 to provide a signal to the LAD circuit 36, the supply voltage for this circuit being obtained directly from conductor 49 through conductor 39. When a signal is thus applied to the base of the transistor 38, the transistor 38 is made conductive, the transistor 37 becoming nonconductive, and an output voltage is obtained from the LAD circuit 36, which, as previously described, is amplified by the transistor amplifier 42 and energizes the field relay 13 to close its contact 15. The excitation circuit for the generator 1 is thus completed and field excitation is applied so that the generator can build up its voltage.

When it is now desired to connect the generator to the bus 9, the switch 122 is placed on the On contact. This connects the direct current supply conductor 49 to conductor 19 to energize the LAD circuit 16. As previously indicated, the LAD circuit 16 is arranged so that the transistor 18 is conductive and the transistor 17 is nonconductive at this time. The direct current supply voltage is also connected by the switch, through resistor 123, to the And circuit 75. This circuit consists of two rectifiers 135 and 136 connected as shown. If no signal is applied to either of these rectifiers, or to only one of them, the signal applied through resistor 123 is shorted to ground through one or both of the rectifiers. When signals are applied to both rectifiers, however, they are biased in the reverse direction, so that current cannot flow to ground, and an output signal is applied through the Zener diode 137 and conductor 25 to the base of transistor 17.

As previously described, a signal is applied to the And circuit 75 from the potentiometer 60 proportional to the generator voltage, and a signal is applied to the And circuit 75 through conductor 100 when the generator frequency is above the predetermined minimum value. Thus, when the generator frequency and voltage have reached their normal values and the switch 120 is in the On position, the And circuit 75 supplies a signal to the base of the transistor 17 so that that transistor becomes conductive and transistor 18 ceases to be conductive. The LAD circuit 16 then supplies an output voltage which, as previously described, is amplified by the amplifier 27 and energizes the pilot relay 30 which closes its contact 33 and energizes the closing coil 11 of the circuit breaker 10 to close the breaker and connect the generator to the bus 9. The system is now in its normal operating condition.

If an overvoltage condition occurs while the generator is in operation, the overvoltage sensing circuit 61 supplies an output signal to the Or circuit 68 as previously described. Similarly, if an undervoltage condition occurs, the undervoltage sensing circuit 76 supplies a signal to the Or circuit 68, and if a fault occurs in the generator or on the leads 4, the fault sensing circuit 115 supplies a signal to the Or circuit 68. If either an undervoltage or overvoltage condition occurs, the signal to the Or circuit reaches the breakdown voltage of the Zener diode 72 after a predetermined time delay, as determined by the time delay circuits 74 and 82, respectively, while if a signal occurs from the fault circuit 115 the diode 72 breaks down without delay for instantaneous operation. Under any of these conditions, therefore, a signal is supplied through conductor 41 to the base of the transistor 37 of the LAD circuit 36, making that transistor conductive, and the transistor 38 ceases to conduct. The coil 14 of the field relay 13 is thus deenergized and the relay opens its contact 15 to interrupt the exciter field circuit and remove field excitation from the generator. The circuit breaker 10 is not tripped under these conditions, and the generator excitation can be restored by placing the switch 122 on the Reset contact.

If the generator frequency falls below normal, the frequency sensing circuit 90 interrupts its output signal. When this occurs, as previously explained, the Not circuit 102 supplies an output signal through the time delay circuit 103 which is applied through conductor 26 to the base of the transistor 18 of the LAD circuit 16, making that transistor conductive while the transistor 17 ceases to be conductive. The pilot relay 31 is thus deenergized and closes its contact 32 to energize the trip coil 12 and trip the circuit breaker 10, so that the breaker is tripped, after a time delay, in response to underfrequency.

At the same time, the Not circuit 111 provides an output signal, as previously described, to the conductor 113 and through the Or circuit 77 to the undervoltage sensing circuit 76. This signal maintains the transistor 81 in a conductive condition so that there is no output signal from the undervoltage sensing circuit. Thus on a normal shutdown of the generator, when both voltage and frequency drop below their normal values, the undervoltage sensing circuit 76 is prevented from operating and the field relay 13 is not tripped. The circuit breaker 10 is tripped by the underfrequency condition but field excitation is maintained on the generator so that it is ready to be reconnected to the line as soon as the frequency and voltage again come up to normal and supply signals to the And circuit 75, which results in automatic closing of the breaker 10 in the manner described above if the switch 122 has been left in the On position. The breaker 10 can be tripped at any time during operation of the generator by placing the switch 122 on the Off contact which directly energizes the trip coil 12 from the direct current supply conductor 49.

The lockout LAD circuit 129 prevents cycling of the system under fault conditions. Thus, when the switch 122 is placed on the Reset contact, supply voltage is applied to the LAD circuit 129 through conductor 128. If no fault condition exists at this time, the transistor 130 is nonconducting and the transistor 131 is conducting. Thus there is no output signal from the LAD circuit 129 and the LAD circuit 36 functions as described above. However, if a fault condition, or an overvoltage or undervoltage condition exists when the switch 122 is placed in the Reset position, a signal will be applied through the Or circuit 68 and conductor 132 to the base of the transistor 130, making it conductive, and the transistor 131 ceases to conduct. A voltage therefore appears across transistor 131 which is applied to the base of the shorting transistor 134 making it conductive. The voltage applied from the switch 122 through resistor 125 is therefore shorted to ground 46 through transistor 134, and is diverted from the LAD circuit 36. It is therefore impossible to effect closing of the field relay 13 during the existence of a fault condition, and the system canot cycle even if the switch 122 is placed on the Reset contact or held there during the fault.

It will now be apparent that a static generator control and protective system has been provided which eliminates the disadvantages of previously used conventional relay systems. No accurately calibrated sensitive relays are required, since all sensing and control functions are performed by static circuits, and the problems of maintaining accurate calibration are eliminated. The pilot relay and field relay shown respond only to on-off signals and do not need to be accurately calibrated, so that small, rugged relays of high reliability can be used. The sensing and control functions are performed at a low power level with only the final output signals amplified sufficiently to operate the relays. Thus, there is no serious problem of heat dissipation since little power is used in the system. The static components used are rugged and highly reliable and are not adversely affected by severe environmental conditions such as extreme temperature change, mechanical shock or vibration, and other adverse conditions such as are encountered in aircraft service. The static components may be of extremely small size, because of the low power level, and can conveniently be mounted on printed circuit boards so that a very compact assembly is possible. The new system is also very flexible in application, since sensing circuits of various types, responsive to different conditions, can readily be added to the system to effect operation in a desired manner in response to any predetermined conditions. Thus, a static control and protective system has been provided, based on a new approach to the problem, which eliminates the disadvantages of conventional relay systems and makes possible systems of small size and light weight with a very high degree of reliability.

A specific embodiment of the invention has been shown and described for the purpose of illustration, but it will be apparent that the invention is not limited to the specific arrangement shown since this is only illustrative of one of the various forms of embodiment possible within the scope of the invention.

We claim as our invention:

1. A control and protective system for an electric generator having a field winding, said system comprising switch means for connecting the generator to a load bus, field control means for controlling the energization of the generator field winding, a plurality of static sensing circuits for providing signal voltages in response to different predetermined conditions of the generator, and static flip-flop circuits controlled by said signal voltages for effecting operation of said switch means and of said field control means.

2. A control and protective system for an electric generator having a field winding, said system comprising switch means for connecting the generator to a load bus, field control means for controlling the energization of the generator field winding, a plurality of static sensing circuits for providing signal voltages in response to different predetermined conditions of the generator, a first static flip-flop circuit for effecting operation of said switch means, a second static flip-flop circuit for effecting operation of said field control means, and means for applying said signal voltages to the first and second flip-flop circuits to control the flip-flop circuits in a predetermined manner.

3. A control and protective system for an electric generator having a field winding, said system comprising switch means for connecting the generator to a load bus, field control means for controlling the energization of the generator field winding, static sensing circuits for providing signal voltages in response to predetermined conditions of the generator, a first static flip-flop circuit for effecting operation of said switch means, a second static flip-flop circuit for effecting operation of said field control means, and static circuit means for mixing said signal voltages and applying them to said flip-flop circuits in a predetermined manner to control the flip-flop circuits.

4. A control and protective system for an alternating current generator having a field winding, said system comprising switch means for connecting the generator to a load bus, field relay means for controlling the energization of said field winding, static sensing circuits for providing signal voltages in response to predetermined conditions of the generator, a first flip-flop circuit for effecting operation of said switch means, a second flip-flop circuit for effecting operation of said field relay means, and static circuit means for mixing said signal voltages in a predetermined manner and applying them to said flip-flop circuits to control the flip-flop circuits.

5. A control and protective system for an alternating current generator having a field winding, said system comprising switch means for connecting the generator to a load bus, field relay means for controlling the energization of said field winding, a static overvoltage sensing circuit for providing a signal voltage when the generator voltage exceeds a predetermined value, a static undervoltage sensing circuit for providing a signal voltage when the generator voltage is below a predetermined value, a flip-flop circuit for effecting operation of said field relay means, and static circuit means for applying said signal voltages to said flip-flop circuit to control the flip-flop circuit to effect deenergization of the generator field winding in response to the presence of either of said signal voltages.

6. A control and protective system for an alternating current generator having a field winding, said system comprising switch means for connecting the generator to a load bus, field relay means for controlling the energization of said field winding, a static overvoltage sensing circuit for providing a signal voltage when the generator voltage exceeds a predetermined value, a static fault sensing circuit for providing a signal voltage in response to a fault in the generator, a flip-flop circuit for effecting operation of said field relay means, and static circuit means for applying said signal voltages to said flip-flop circuit to control the flip-flop circuit to effect deenergization of the generator field winding in response to the presence of either of said signal voltages.

7. A control and protective system for an alternating current generator having a field winding, said system comprising switch means for connecting the generator to a load bus, field relay means for controlling the energization of said field winding, a static overvoltage sensing circuit for providing a signal voltage when the generator voltage exceeds a predetermined value, a static undervoltage sensing circuit for providing a signal voltage when the generator voltage is below a lower predetermined value, a static fault sensing circuit for providing a signal voltage in response to a fault in the generator, a flip-flop circuit for effecting operation of said field relay means, and static circuit means for applying said signal voltages to said flip-flop circuit to control the flip-flop circuit to effect deenergization of the generator field winding in response to the presence of any one of said signal voltages.

8. A control and protective system for an alternating current generator having a field winding, said system comprising switch means for connecting the generator to a load bus, field relay means for controlling the energization of said field winding, a static overvoltage sensing circuit for providing a signal voltage when the generator voltage exceeds a predetermined value, a static undervoltage sensing circuit for providing a signal voltage when the generator voltage is below a lower predetermined value, a static frequency sensing circuit adapted to provide a signal voltage when the generator frequency is above a predetermined value, circuit means for preventing the appearance of a signal voltage from said undervoltage sensing circuit in the absence of a signal voltage from the frequency sensing circuit, a flip-flop circuit for effecting operation of said field relay means, and static circuit means for applying said signal voltages to control the flip-flop circuit to effect deenergization of the generator field winding in response to the presence of a signal voltage from either the overvoltage sensing circuit or the undervoltage sensing circuit.

9. A control and protective system for an alternating current generator having a field winding, said system comprising switch means for connecting the generator to a load bus, field relay means for controlling the energization of said field winding, a static frequency sensing circuit adapted to provide a signal voltage when the generator frequency is above a predetermined value, a flip-flop circuit for effecting operation of said switch means, manual means for applying an energizing voltage to said flip-flop circuit, means for providing a signal voltage derived from the generator voltage, and circuit means for applying said voltages to the flip-flop circuit when all three said voltages are present to control the flip-flop circuit to effect closing of the switch means.

10. A control and protective system for an alternating current generator having a field winding, said system comprising switch means for connecting the generator to a load bus, field relay means for controlling the energization of said field winding, a static frequency sensing circuit adapted to provide a signal voltage when the generator frequency is above a predetermined value, a flip-flop circuit for effecting operation of said switch means, manual means for applying an energizing voltage to said flip-flop circuit, means for providing a signal voltage derived from the generator voltage, circuit means for applying said voltages to the flip-flop circuit when all three said voltages are present to control the flip-flop circuit to effect closing of the switch means, and means for applying a voltage to the flip-flop circuit in the absence of a signal voltage from the frequency sensing circuit to control the flip-flop circuit to effect opening of the switch means.

11. A control and protective system for an alternating current generator having a field winding, said system comprising switch means for connecting the generator to a load bus, field relay means for controlling the energization of said field winding, a static overvoltage sensing circuit for providing a signal voltage when the generator voltage exceeds a predetermined value, a static undervoltage sensing circuit for providing a signal voltage when the generator voltage is below a lower predetermined value, a static frequency sensing circuit adapted to provide a signal voltage when the generator frequency is above a predetermined value, circuit means for preventing the appearance of a signal voltage from said undervoltage sensing circuit in the absence of a signal voltage from the frequency sensing circuit, a first flip-flop circuit for effecting operation of said switch means, a second flip-flop circuit for effecting operation of said field relay means, manual means for applying a voltage to the second flip-flop circuit to control the second flip-flop circuit to effect energization of the generator field winding and for applying an energizing voltage to the first flip-flop circuit, means for providing a signal voltage derived from the generator voltage, circuit means for applying said signal voltages from the frequency sensing circuit and from the generator voltage and said energizing voltage to the first flip-flop circuit when all three last-mentioned voltages are present to control the first flip-flop circuit to effect closing of the switch means, and circuit means for applying the signal voltages from the overvoltage sensing circuit and the undervoltage sensing circuit to the second flip-flop circuit to control the second flip-flop circuit to effect deenergization of the generator field winding in response to the presence of a signal voltage from either the overvoltage sensing circuit or the undervoltage sensing circuit.

12. A control and protective system for an alternating current generator having a field winding, said system comprising switch means for connecting the generator to a load bus, field relay means for controlling the energization of said field winding, a static overvoltage sensing circuit for providing a signal voltage when the generator voltage exceeds a predetermined value, a static undervoltage sensing circuit for providing a signal voltage when the generator voltage is below a lower predetermined value, a static frequency sensing circuit adapted to provide a signal voltage when the generator frequency is above a predetermined value, circuit means for preventing the appearance of a signal voltage from said undervoltage sensing circuit in the absence of a signal voltage from the frequency sensing circuit, a first flip-flop circuit for effecting operation of said switch means, a second flip-flop circuit for effecting operation of said field relay means, manual means for applying a voltage to the second flip-flop circuit to control the second flip-flop circuit to effect energization of the generator field winding and for applying an energizing voltage to the first flip-flop circuit, means for providing a signal voltage derived from the generator voltage, circuit means for applying said signal voltages from the frequency sensing circuit and from the generator voltage and said energizing voltage to the first flip-flop circuit when all three last-mentioned voltages are present to control the first flip-flop circuit to effect closing of the switch means, circuit means for applying the signal voltages from the overvoltage sensing circuit and the undervoltage sensing circuit to the second flip-flop circuit to effect deenergization of the generator field winding in response to the presence of a signal voltage from either the overvoltage sensing circuit or the undervoltage sensing circuit, and means for applying a voltage to the first flip-flop circuit in the absence of a signal voltage from the frequency sensing circuit to control the first flip-flop circuit to effect opening of the switch means.

13. A control and protective system for an alternating current generator having a field winding, said system comprising switch means for connecting the generator to a load bus, field relay means for controlling the energization of said field winding, a static overvoltage sensing circuit for providing a signal voltage when the generator voltage exceeds a predetermined value, a static undervoltage sensing circuit for providing a signal voltage when the generator voltage is below a lower predetermined value, a static fault sensing circuit for providing a signal voltage in response to a fault in the generator, a static frequency sensing circuit adapted to provide a signal voltage when the generator frequency is above a predetermined value, circuit means for preventing the appearance of a signal voltage from said undervoltage sensing circuit in the absence of a signal voltage from the frequency sensing circuit, a first flip-flop circuit for effecting operation of said switch means, a second flip-flop circuit for effecting operation of said field relay means, manual means for applying a voltage to the second flip-flop circuit to control the second flip-flop circuit to effect energization of the generator field winding and for applying an energizing voltage to the first flip-flop circuit, means for providing a signal voltage derived from the generator voltage, circuit means for applying said signal voltages from the frequency sensing circuit and from the generator voltage and said energizing voltage to the first flip-flop circuit when all three last-mentioned voltages are present to control the first flip-flop circuit to effect closing of the switch means, and circuit means for applying the signal voltages from the overvoltage sensing circuit, the undervoltage sensing circuit and the fault sensing circuit to the second flip-flop circuit to control the second flip-flop circuit to effect deenergization of the generator field winding in response to the presence of a signal voltage from any one of the overvoltage, undervoltage and fault sensing circuits.

14. A control and protective system for an alternating current generator having a field winding, said system comprising switch means for connecting the generator to a load bus, field relay means for controlling the energization of said field winding, static sensing circuits for providing signal voltages in response to predetermined conditions of the generator, a flip-flop circuit for effecting operation of said field relay means, circuit means for applying said signal voltages to said flip-flop circuit to control the flip-flop circuit to effect deenergization of the generator field winding in response to the presence of any one of said signal voltages, means for applying a control voltage to the flip-flop circuit to control the flip-flop circuit to effect energization of the generator field winding, and static circuit means actuated by said signal voltages for preventing application of the control voltage to the flip-flop circuit in the presence of any one of the signal voltages.

15. A control and protective system for an alternating current generator having a field winding, said system comprising switch means for connecting the generator to a load bus, field relay means for controlling the energization of said field winding, a static overvoltage sensing circuit for providing a signal voltage when the generator voltage exceeds a predetermined value, a static undervoltage sensing circuit for providing a signal voltage when the generator voltage is below a lower predetermined value, a flip-flop circuit for effecting operation of said field relay means, circuit means for applying said signal voltages to said flip-flop circuit to control the flip-flop circuit to effect deenergization of the generator field winding in response to the presence of any one of said signal voltages, means for applying a control voltage to the flip-flop circuit to control the flip-flop circuit to effect energization of the generator field windings, and static circuit means actuated by said signal voltages for preventing application of the control voltage to the flip-flop circuit in the presence of any one of the signal voltages.

16. A control and protective system for an electric generator having a field winding, said system comprising switch means for connecting the generator to a load bus, field control means for controlling the energization of the generator field winding, a plurality of static sensing circuits for providing output signals in response to different predetermined conditions of the generator, and static control circuit means actuated by said output signals to effect operation of said switch means and of said field control means in a predetermined manner.

17. A control and protective system for an electric generator having a field winding, said system comprising switch means for connecting the generator to a load bus, field control means for controlling the energization of the generator field winding, a plurality of static sensing circuits for providing output signals in response to different predetermined conditions of the generator, static control circuit means for effecting operation of said switch means and of said field control means, and static circuit means for applying said output signals to actuate said control circuit means in a predetermined manner.

References Cited in the file of this patent
UNITED STATES PATENTS

| | | |
|---|---|---|
| 1,906,817 | Seeley | May 2, 1933 |
| 2,484,247 | Ratz | Oct. 11, 1949 |
| 2,665,845 | Trent | Jan. 12, 1954 |
| 2,778,978 | Drew | Jan. 22, 1957 |